(12) United States Patent
Foss et al.

(10) Patent No.: US 7,688,057 B2
(45) Date of Patent: Mar. 30, 2010

(54) NOISE DIAGNOSIS OF OPERATING CONDITIONS FOR AN ELECTROMAGNETIC FLOWMETER

(75) Inventors: Scot R. Foss, Eden Prairie, MN (US); Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 348 days.

(21) Appl. No.: 11/825,866

(22) Filed: Jul. 10, 2007

(65) Prior Publication Data
US 2009/0015236 A1   Jan. 15, 2009

(51) Int. Cl.
*G01R 19/00* (2006.01)
(52) U.S. Cl. .............. 324/76.11; 324/613; 324/614; 73/861.12
(58) Field of Classification Search ............. 324/76.11, 324/613, 614; 73/861.12
See application file for complete search history.

(56) References Cited

U.S. PATENT DOCUMENTS

| 4,204,240 | A | 5/1980 | Schmoock | 361/152 |
|---|---|---|---|---|
| 4,614,121 | A | 9/1986 | Hansen et al. | 73/861.12 |
| 4,641,537 | A | 2/1987 | Hansen et al. | 73/861.12 |
| 4,723,449 | A | 2/1988 | Tiley | 73/861.17 |
| 4,748,856 | A | 6/1988 | Tiley | 73/861.17 |
| 4,916,381 | A | 4/1990 | Gelecinskyj et al. | 323/285 |
| 4,972,722 | A | 11/1990 | Hansen et al. | 73/861.17 |
| 5,045,963 | A | 9/1991 | Hansen et al. | 361/87 |
| 5,090,250 | A | 2/1992 | Wada | 73/861.12 |
| 5,487,310 | A | 1/1996 | Higuchi | 73/861.17 |
| 5,639,970 | A | 6/1997 | Schulz | 73/861.12 |
| 6,594,613 | B1 | 7/2003 | Ley et al. | 702/140 |
| 6,615,149 | B1 | 9/2003 | Wehrs | 702/76 |
| 6,644,127 | B1 | 11/2003 | Matzen | 73/861.12 |
| 6,763,729 | B1 | 7/2004 | Matzen | 73/861.12 |
| 6,973,839 | B2 | 12/2005 | Wray | 73/861.12 |
| 2006/0235634 | A1 | 10/2006 | Florin | 702/75 |

FOREIGN PATENT DOCUMENTS

| JP | 04-066818 | 3/1992 |
|---|---|---|
| JP | 06-258113 | 9/1994 |
| WO | WO 98/49528 | 11/1998 |
| WO | WO 2007/033697 | 3/2007 |

OTHER PUBLICATIONS

Notification of Transmittal of the International Search Report and Written Opinion, in related application PCT/US2008/008172, dated Oct. 24, 2008.

*Primary Examiner*—Vincent Q Nguyen
(74) *Attorney, Agent, or Firm*—Westman, Champlin & Kelly, P.a.

(57) ABSTRACT

An analysis circuit in an electromagnetic flowmeter provides diagnostic operating conditions and identifies one or more of the diagnostic operating conditions for which the coil current is stable during a sample interval. A diagnostic operating condition is selected as a measurement operating condition as a function of a noise floor measurements of the electrode voltage.

25 Claims, 7 Drawing Sheets

NOISE DIAGNOSIS OF OPERATING CONDITIONS FOR AN ELECTROMAGNETIC FLOWMETER

BACKGROUND OF THE INVENTION

In many magnetic flow meter applications, there is a substantial amount of 1/f noise that interferes with measurement of flow voltage at flow meter electrodes. This noise is higher at lower frequencies and decreases as the frequency increases. One way to improve the signal-to-noise Ratio (SNR) of the electrode voltage measurement is to increase the frequency of the coil drive current. By increasing coil drive current frequency from 5 Hz to 37 Hz, for example, the 1/F noise level decreases at the measurement frequency while the electrode voltage level stays the same. The SNR increases and more accurate flow measurements can be made. The noise floor at 5 Hz can be many times greater than the noise floor at 37.5 Hz. The noise floor is typically 3 to 5 times higher at 5 Hz than it is at 37.5 Hz. Noise increases approximately as 1/frequency. Doubling the operating frequency can improve SNR by a factor of 3-5 or more.

Flow tubes are manufactured in a wide range of pipe sizes. Larger flow tubes, such as 24 inch diameter flow tubes, are difficult to drive at higher coil frequencies because they have high inductance. The large coils are slow to respond to a change in coil current direction due to their high inductance and resistance.

A method and magnetic flow transmitter are needed that are compatible with a wide range of flow tube sizes and electrode noise levels encountered in the industrial flow measurement environment.

SUMMARY

Disclosed are a method and an analysis circuit for an electromagnetic flow tube and transmitter. The analysis circuit comprises a controller providing a sequence of diagnostic operating conditions of coil current amplitude and frequency for a coil of the flow tube.

The analysis circuit further comprises an identification circuit which identifies one or more of the diagnostic operating conditions for which the coil current is stable during a sample interval.

The analysis circuit includes a noise floor measurement circuit. The noise floor measurement circuit measures a noise floor of a flow tube electrode voltage for the identified diagnostic operating conditions.

The analysis circuit further comprises a selection circuit. The selection circuit selects at least one of the diagnostic operating conditions as a measurement operating condition as a function of the noise floor measurements.

DETAILED DESCRIPTION

Figure 1:
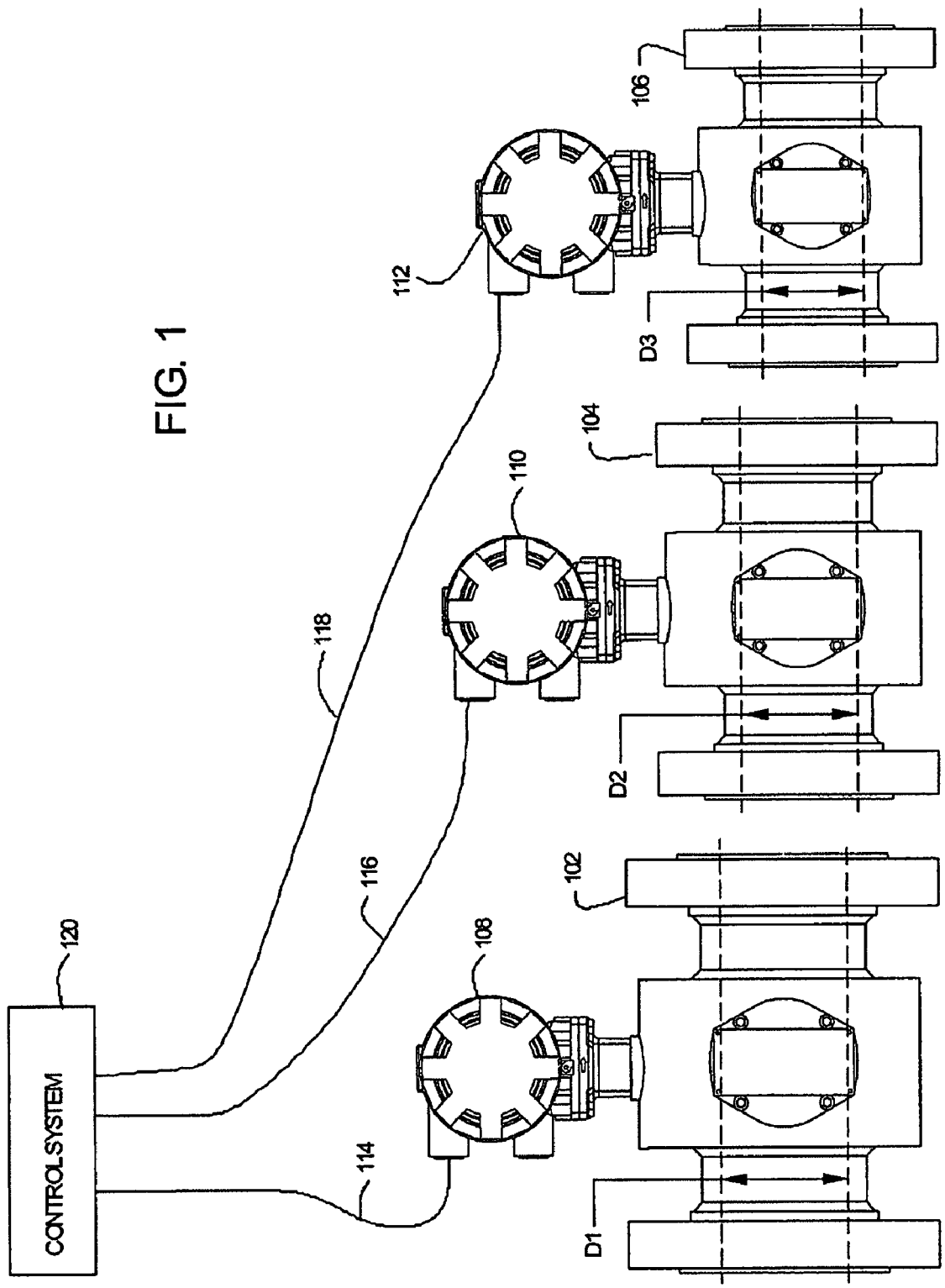
FIG. 1 illustrates an industrial process control environment.

In the embodiments described below, an analysis circuit provides a sequence of diagnostic operating conditions and identifies one or more of the diagnostic operating conditions for which the coil current is stable during a sample interval. One of the diagnostic operating conditions is selected as a measurement operating condition as a function of a noise floor measurements of the electrode voltage.

A coil drive current can be set at 0.5 amperes, for example. In order to overcome the inductance and resistance of the flow tube, and in order to drive coil current to a stable value of 0.5 amperes, a boost voltage is applied across the coil. The boost voltage applied is much greater than the voltage required to sustain the required 0.5 ampere current. The boost voltage is applied only temporarily to obtain a fast initial current rise time. For various reasons, the boost voltage is limited in amplitude and duration.

For a given boost voltage, larger coils can run at a higher drive frequency if the coil current is set to a lower set point. For example, the coil current can be reduced from 0.5 amperes to 0.25 amperes. By lowering the coil current set point by a factor of two, the coil current will reach a stable value approximately twice as fast. This change in some larger flow tube sizes allows a transmitter to drive at the higher coil frequency and achieve a 3 to 5 times better SNR which will result in a output signal 3 to 5 times better.

The coil current and coil frequency at diagnostic operating conditions are adjusted to give the highest measurement of signal-to-noise ratio (SNR). This can be an automatic process or can be commanded by an operator. The operating set point can also be preset at factory based on known properties of different line sizes and the typical noise signature for the expected fluids.

In a first step, the maximum possible coil frequency for the different coil currents are tested. An alternative to this would be to manually calculate the max coil frequency using data calculated empirically from different line sizes. The possible coil frequencies could be fixed and easily counted down from line frequency (5 Hz, 18.75 Hz and 37.5 Hz, for example) or it could be any arbitrary coil frequency such as 43.5 Hz or 86 Hz. In once example, the coil frequency is an even multiples of line frequency. This results in an equal amount of energy in positive and negative cycles during measurement portions providing noise cancellation.

In a second step, the noise floor can be measured for all of the frequency and current combinations (diagnostic operating conditions) of interest. In one embodiment, noise floor is measured using fast Fourier transform (FFT) or other spectral analysis of the electrode voltage. The noise floor is generally independent of the coil current, and in one embodiment, the noise floor is measured only once for each frequency.

Making measurements under flowing conditions also has the advantage of being able to use actual flow voltage measurements, including noise, in calculating signal to noise ratio. The signal to noise ratio (SNR) can be calculated by Equation 1:

$$SNR = \frac{Signal * (coilcurrent/maxcoilcurrent)}{\text{Noise at Coil Frequency}} \quad \text{Eq. 1}$$

FIG. 1 illustrates an industrial process control environment. The industrial process control environment includes electromagnetic flow tubes 102, 104, 106. The electromagnetic flow tubes 102, 104, 106 have nominal inside pipe diameters D1, D2, D3 that differ from one another as illustrated.

Flow tube 102 connects to an electromagnetic flow transmitter 108, flow tube 104 connects to an electromagnetic flow transmitter 110, and flow tube 106 connects to electromagnetic flow transmitter 112. The flow transmitters 108, 110, 112 have a common design with common electrical characteristics. As described in more detail below, the flow transmitters 108, 110, 112 have adaptable electrical characteristics that adapt the operation of the flow transmitters 108, 110, 112 to accommodate different pipe diameters, different properties of the fluids passing through the flow tubes 102, 104, 106 and differing industrial process operating environments. The adaptation is accomplished by noise measurements at multiple diagnostic operating conditions and by selection of an optimal operating condition.

As described in more detail below, the flow transmitters 108, 110, 112 provide a drive current that energizes inductive coils on the flowtubes to produce a magnetic field in fluid that flows through the flowtube. The flow transmitters 108, 110, 112 connect to flow tube electrodes that produce a magnetically induced flow potential. The flow transmitters 108, 110, 112 convert the magnetically produced potential to a flow signal that couples to the control system 120.

An industrial process control system 120 is preferably connected by cables 114, 116, 118 to the flow transmitters 108, 110, 112. The control system 120 provides energization to the flow transmitters 108, 110, 112. The flow transmitters 108, 110, 112 provide flow signals to the control system 120 for controlling the industrial process control environment. In one embodiment, the cables include control loop that provides an analog 4-20 mA current that represents flow through the flow tube, and also may include HART® digital signaling. Other known industrial process control communication protocols can be used as well.

The diameter of a flow tube is selected based on a number of competing design considerations. A larger diameter can be selected match the diameter of a pipeline into which the flow tube is inserted. This larger diameter makes installation easier (because pipe flanges are the same size) and also tends to reduce the pressure drop through the flow tube, which reduces power consumed in pumping fluids. A smaller diameter can be selected to increase fluid flow velocity. The increased fluid flow velocity provides an increased electrode flow potential and helps to prevent undesired deposition of solids in the flow tube. Typically, flow tubes-are designed to have same µV/ft/sec signal output independent of line size at a +/−0.5 amps coil current. A reduced flange size may also provide increased velocity.

Inductive coils in the different diameter flow tubes 102, 104, 106 have different resistances and inductances. The transmitters 108, 110, 112 have coil current drivers circuits that adapt to the different resistances and inductances, as well as to noise floor levels at the flowtube electrodes.

Figure 2:
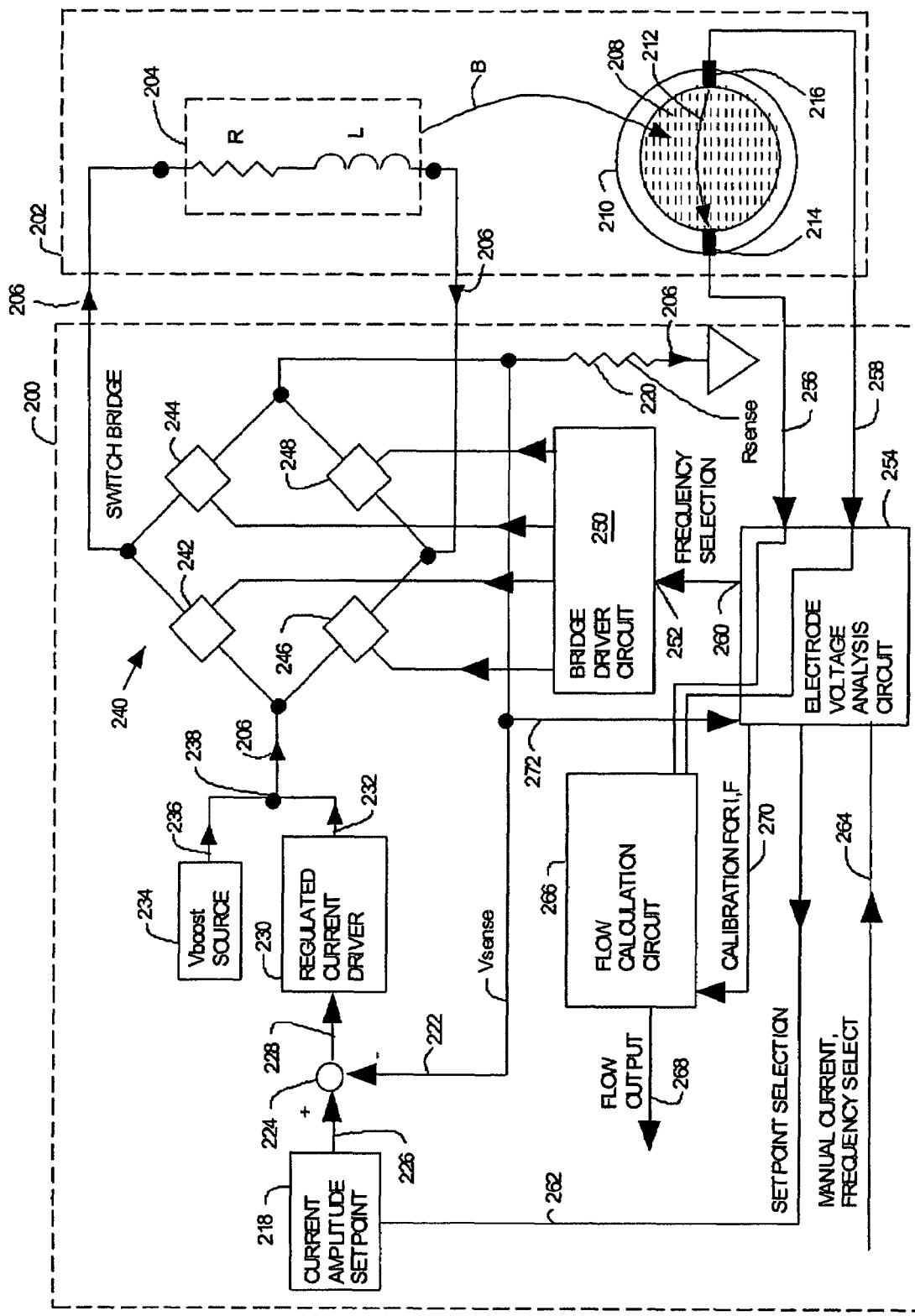
FIG. 2 illustrates a schematic diagram of an electromagnetic flow transmitter connected to a flow tube.

FIG. 2 illustrates a schematic diagram of an electromagnetic flow transmitter 200 (such as transmitters 108, 110, 112 in FIG. 1) connected to a flow tube 202 (such as flow tube 102, 104, 106 in FIG. 1. The flow tube 202 comprises inductive coils 204. A drive current 206 through the inductive coil 204 generates a magnetic field B. The magnetic field B interacts with fluid 208 in insulated pipe 210 to generate a flow potential 212 at electrodes 214, 216. The flow potential 212 is proportional to the flow velocity of the fluid 208 and the magnetic field B.

The inductive coil (or coils) 204 have sizes and shapes that are adapted to fit an outside diameter of the pipe 210. The drive current 206 is controlled to have a controlled peak-to-peak steady state amplitude for multiple line sizes, and the inductive coils for each line size are wound such that the flow potential 212 is substantially the same for the same fluid flow velocity in multiple line sizes. In one embodiment, for example, the drive current 206 has a steady state amplitude of 1 ampere (i.e., +/−0.5 amperes) and the flow potential has a steady state amplitude of 2 millivolts for a fluid flow velocity of 9 meters per second. The term "steady state" as used in this application refers to a substantially steady value during a sample interval after switching transients have settled out.

Each inductive coil (or coils) 204 has an equivalent series resistance R and an equivalent series inductance L. The magnitudes of R and L are different for each line size. Each fluid 208 that flows through the pipe 210 has an equivalent resistance (between electrodes 214, 216) and noise characteristics. The equivalent resistance and the noise characteristics are different for each fluid 208, and can be further variable as a function of environmental parameters such as temperature.

Upon initial application of power to the flow transmitter 200, a current amplitude set condition 218 is automatically set to an initial set condition value. In one embodiment, the initial set condition value corresponds with 0.5 amperes of coil current. In another embodiment, the initial set condition value corresponds with a value that was selected the last time the flow transmitter 200 was energized. The coil current 206 flows through a current sense resistor 220. The current sense resistor generates a voltage Vsense on line 222.

A summing junction 224 receives the voltage Vsense on line 222 and a set condition potential on line 226. The summing junction 224 generates an error potential on line 228. The error potential 228 couples to a regulated current driver 230. The regulated current driver 230 generates a regulated current output 232.

The regulated current output 232 is a current-limited output. The regulated current output produces a regulated current Ireg that is limited to a maximum regulated current value Iregmax (as described in more detail below in connection with FIG. 3) that is set by the current amplitude set condition 218. The regulated current output 23 has a maximum (compliance) potential Vregmax (as described in more detail below in connection with FIG. 3).

The flow transmitter 200 preferably includes a voltage booster source 234. The voltage booster source generates a boost voltage Vboost on line 236. The boost voltage is a voltage-limited output that has a maximum potential Vboostmax (described in more detail below in connection with FIG. 3) The maximum potential Vboostmax is higher that the maximum compliance potential Vregmax. The voltage booster source generates a boost current Iboost.

The regulated current Ireg and the boost current Iboost are summed at node 238 to form the coil drive current 206. The coil drive current 206 flows through a switch bridge 240, through the coil(s) 204 and through the current sense resistor 220. The switch bridge 240 comprises four solid state switches 242, 244, 246, 248. The switch bridge 240 alternates the direction (polarity) of the coil drive current 206 as it passes through the coil 204. The coil 204 receives a coil drive current 206 that alternates between +Iregmax and −Iregmax (as described in more detail below in connection with FIG. 3).

The switches 242, 244, 246, 248 of switch bridge 240 are controlled by a bridge driver circuit 250. The bridge driver circuit 250 drives the switches 242, 244, 246, 248 with a square wave drive which alternates the direction of current flow through the coil 204. The bridge drive circuit 250 has a frequency selection input 252. The frequency selection input 252 sets a frequency for the square wave drive.

The flow transmitter 200 preferably includes an electrode voltage analysis circuit 254. The electrodes 214, 216 couple to the electrode voltage analysis circuit 254 along lines 256, 258. The electrode voltage analysis circuit provides a frequency selection output 260 to the frequency selection input 252. The electrode voltage analysis circuit 254 provides a current set condition selection on line 262 to the current amplitude set condition circuit 218. The electrode voltage analysis circuit 254 receives a manual selection input 264. A technician can manually override automatic frequency and set condition selections made by the electrode voltage analysis circuit 254 to optimize magnetic flow measurement performance as described in more detail below in connection with FIG. 4. The electrode voltage analysis circuit 254 receives the voltage Vsense on line 272. The operation of the electrode voltage analysis circuit 254 is described in more detail below in connection with a flow chart in FIG. 6.

The electrodes 214, 216 couple voltage along lines 256, 258 to a flow calculation circuit 266. The flow calculation circuit 266 receives the electrode voltage and generates a flow output 268 that is representative of the rate of flow of fluid 208 through pipe 210. The operation of the flow calculation circuit 266 is calibrated for the particular coil drive frequency and coil drive current selected by the electrode voltage analysis circuit 254.

Figure 3:
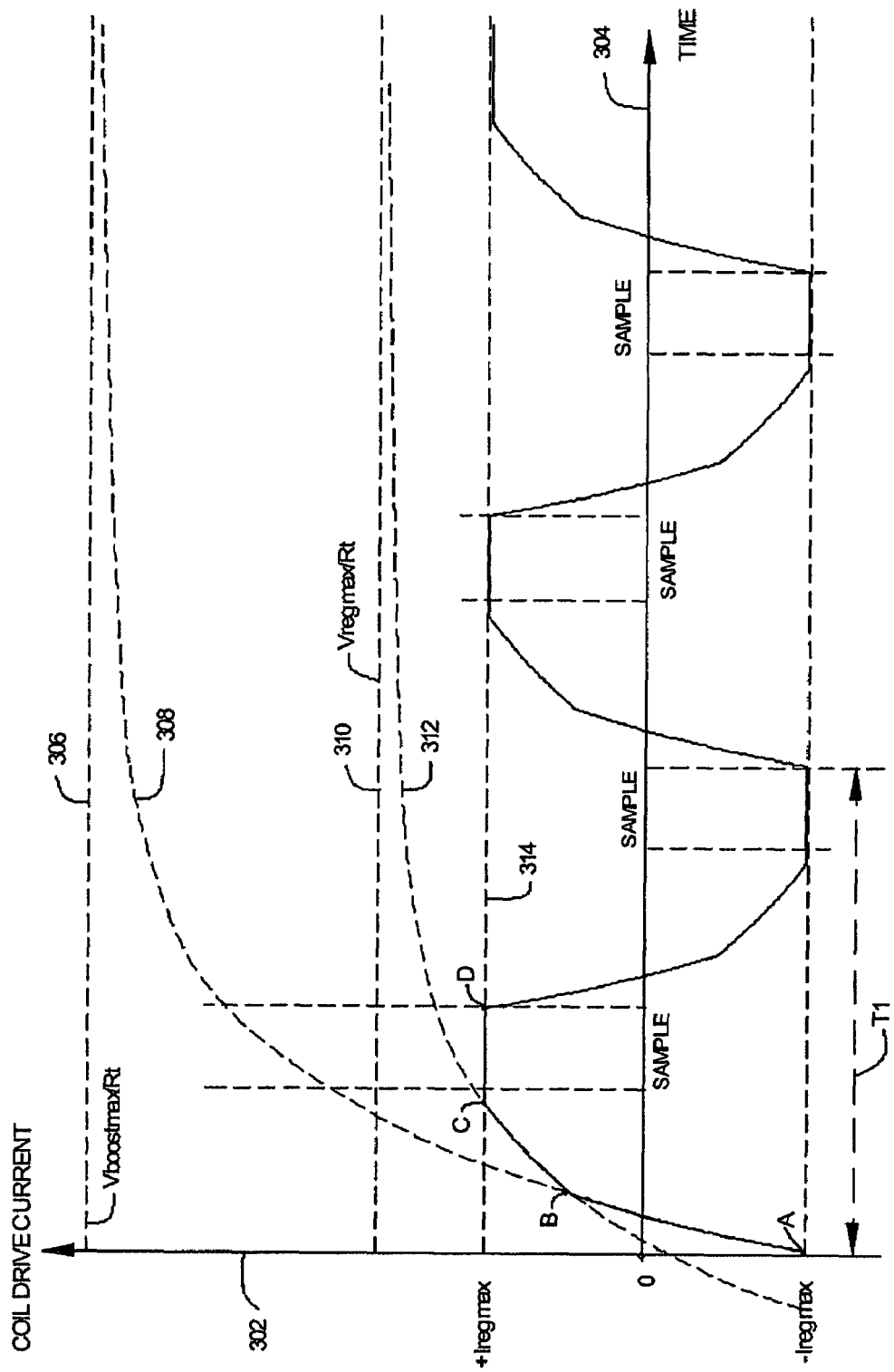
FIG. 3 illustrates an exemplary graph of coil drive current as a function of time.

FIG. 3 illustrates an exemplary graph of coil drive current, as a function of time. A vertical axis 302 represents coil current and a horizontal axis 304 represents time. The coil drive current waveform is a repetitive waveform with a period T1=1/F1 where T is time in seconds and F1 is frequency in hertz. The switching ON in a positive direction of the coil current 206 is illustrated along line segment A-B-C-D.

A first dashed horizontal line 306 indicates an asymptote at a coil current level I=(Vboostmax)/Rt where Rt is a series resistance in the coil drive circuit. Rt is substantially equal to the resistance R of coil 204 but is increased slightly by a resistance Rsense of resistor 220 and the resistances of switches in switch bridge 240 and the resistance of leads. A dashed exponential curve 308 approaches the asymptote 306. The exponential curve 308 has an exponential time constant of approximately L/Rt. During an initial boost time interval, the coil drive current rises rapidly along line segment A-B toward asymptote 306. Line segment A-B approximately follows the dashed exponential curve 308.

A second dashed horizontal line 310 indicates an asymptote at a coil current level I=(Vregmax)/Rt where Rt is the series resistance in the coil drive circuit. A dashed exponential curve 312 approaches the asymptote 306. The exponential curve 308 has an exponential time constant of approximately L/Rt. After the initial boost time interval, the coil drive current rises less rapidly along line segment B-C toward asymptote 310. Line segment B-C which approximately follows the dashed exponential curve 308.

A third dashed horizontal line 314 indicates an asymptote at a coil current level I=Iregmax. Line segment C-D indicates a steady state current of Iregmax where the coil drive current is a stable value. While the coil drive current 206 has a stable value along line segment C-D, the electrode voltage on lines 256, 258 (FIG. 2) is sampled by the flow calculation circuit 266 (FIG. 2). The flow calculation circuit 266 calculates the flow output 268 (FIG. 2) as a function of multiple samples of the electrode voltage.

The exponential time constants of the curves 308, 312 are controlled by the inductance and resistant in the coil drive circuit. The shape of the curves 308 are generally as in FIG. 2:

$$I = I_0 + (V/R) - (V/R)(e^{-t/(L/R)})$$ Eq. 2 where:
I represents coil current;
$I_0$ represents current I at the time of switching;
V represents applied drive voltage;
R represents resistance;
t represents time;
L represents inductance; and
(L/R) represents the exponential time constant.

It can be seen from a study of FIG. 3 that, as coil resistance and inductance change, that the waveform changes shape so that the current may not be stable during a sample interval. It can also be seen from a study of FIG. 3 that changing frequency moves the time position of the sample interval relative to the curve A-B-C and affects stability in the sample interval. It can also be seen from a study of FIG. 3 that changing Iregmax affects stability in the sample interval. Changing the operating condition of the coil current amplitude and frequency can change whether the coil current is stable or not during the sample interval. Note that any current level can be used as desired.

Figure 4:
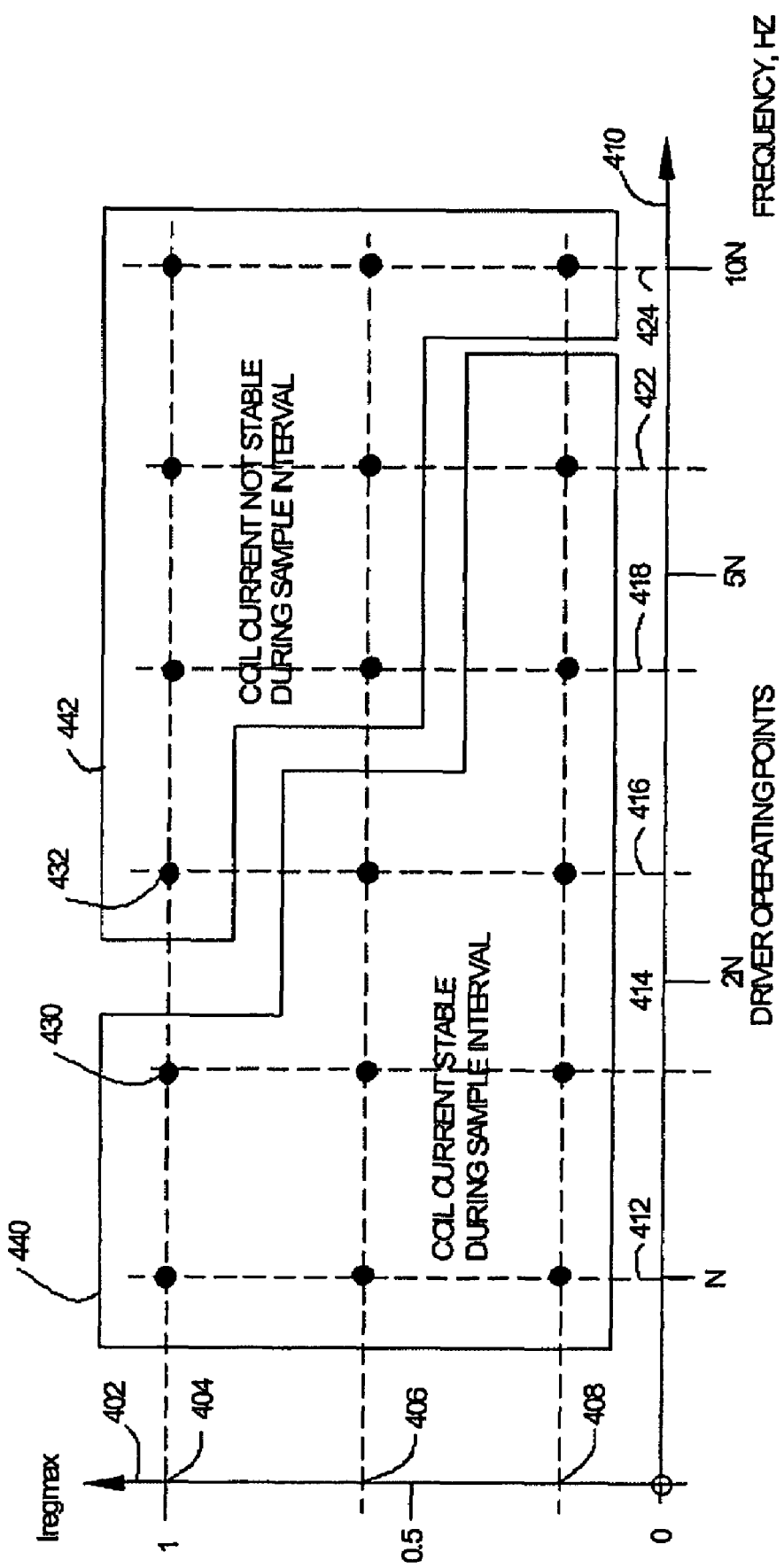
FIG. 4 illustrates diagnostic operating conditions for coil drive current.

FIG. 4 illustrates diagnostic operating conditions for coil drive current 206 (FIG. 2). The diagnostic operating conditions are represented by solid dots such as dots 430, 432. A vertical axis 402 represents peak amplitude of the coil current 206. The electrode voltage analysis circuit 254 (FIG. 2) controls the current amplitude set condition (218 in FIG. 2) to provide one of multiple current amplitude set conditions 404, 406, 408.

A horizontal axis 410 represents frequency of the coil drive current 206. The electrode voltage analysis circuit 254 (FIG. 2) controls the frequency selection output (260 in FIG. 2) to provide one of multiple frequency set conditions 412, 414, 416, 418, 420, 422.

In the example illustrated in FIG. 4, three current amplitude set conditions and six frequency selections are provided, resulting in eighteen possible diagnostic operating combinations of amplitude and frequency. Other number of current amplitudes or frequencies can be used as well.

In the example illustrated in FIG. 4, a large size flow tube is connected to the transmitter, and the L/R ratio is large and not all of the possible combinations provide a stable current level during a sample interval. The coil is driven sequentially at different current amplitude and frequency combinations while the coil current (as sensed on line 272 in FIG. 2) to measure whether the coil current is stable during the sample interval. A group 440 of combinations that provide stable current are identified. A group 442 of combinations that do no provide stable current are eliminated. For the group 440 of combinations that does provide stable current during the sample interval, further evaluation is performed to estimate signal-to-noise ratio at the electrodes (214, 216 in FIG. 2) as described below in connection with FIG. 5.

Figure 5:
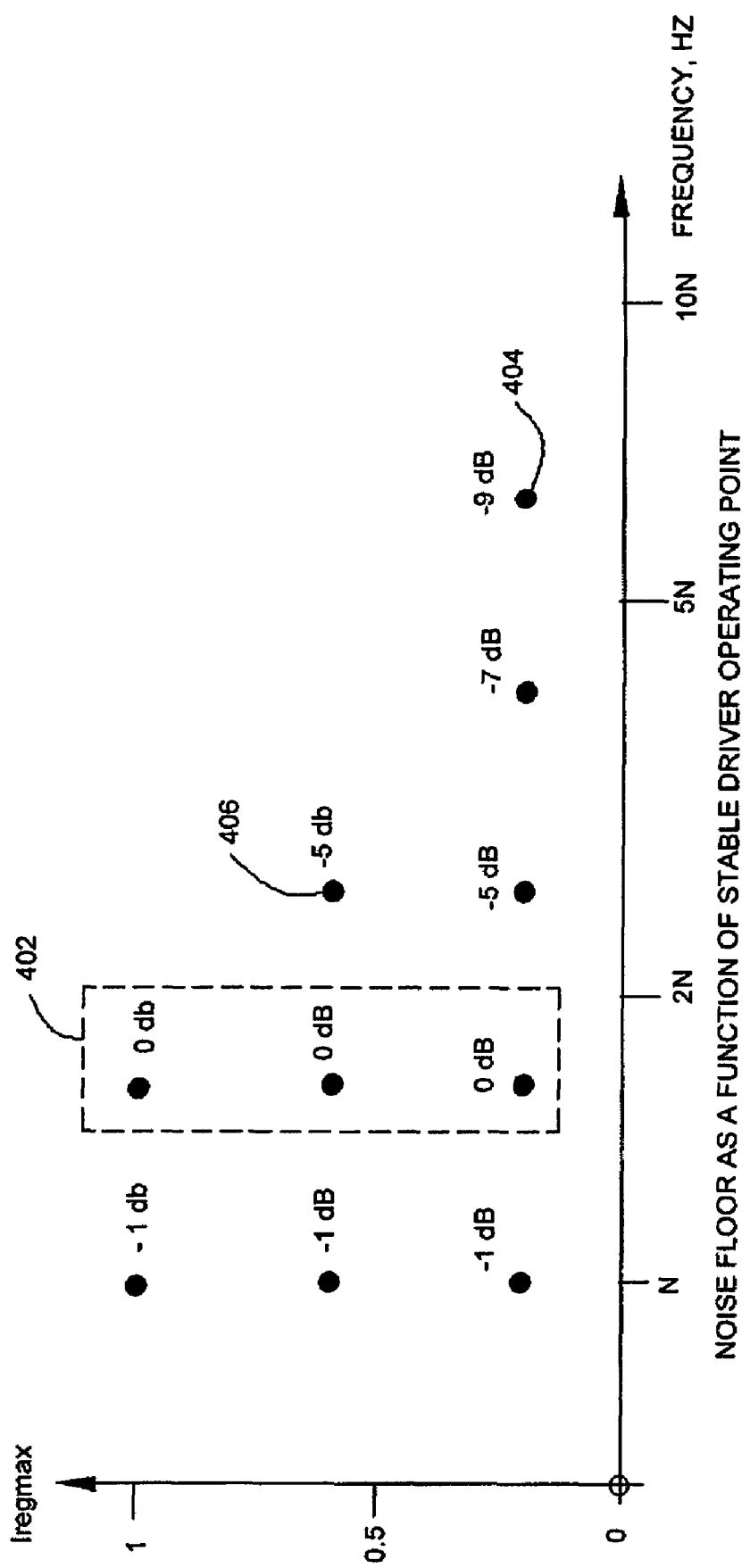
FIG. 5 illustrates measured noise floors for a selected group of diagnostic operating conditions FIG. 4.

FIG. 5 illustrates measured noise floors for the group of operating set points in group 440 in FIG. 4. The electrode voltage analysis circuit 254 (FIG. 2) measures the noise floor at each of the operating set points in FIG. 4. In the example illustrated, the noise floors are expressed in decibels (dB) relative to the flow signal at electrodes 214, 216 for each combination of amplitude and current. In the example illustrated, the general 1/f noise pattern can be seen, with generally lower noise floors at higher frequencies. The frequency axis in FIG. 5 is a logarithmic axis. Note that larger current values, the SNR will increase at a particular frequency. For example, the best SNR may be obtained with a lower drive current and a higher operating frequency. This is because if the coil drive current is reduced, say by 50%, the magnetic field has longer period in which to stabilize, i.e. twice as long. Doubling the operating frequency may lower the noise flow by a factor of 3 to 5 resulting in a higher SNR operating point and a more stable output.

For one particular frequency illustrated at 402, there is an interference source which raises the noise floor somewhat for the three operating conditions at that frequency. An automatic selection of an operating condition selects the operating condition 404 which provides the lowest noise floor relative to the flow signal. An operator, however, may make a manual selection of another operating condition such as operating condition 406 based on the operator's experience. The selection of an operating condition is described in more detail below in connection with FIG. 6.

Figure 6:
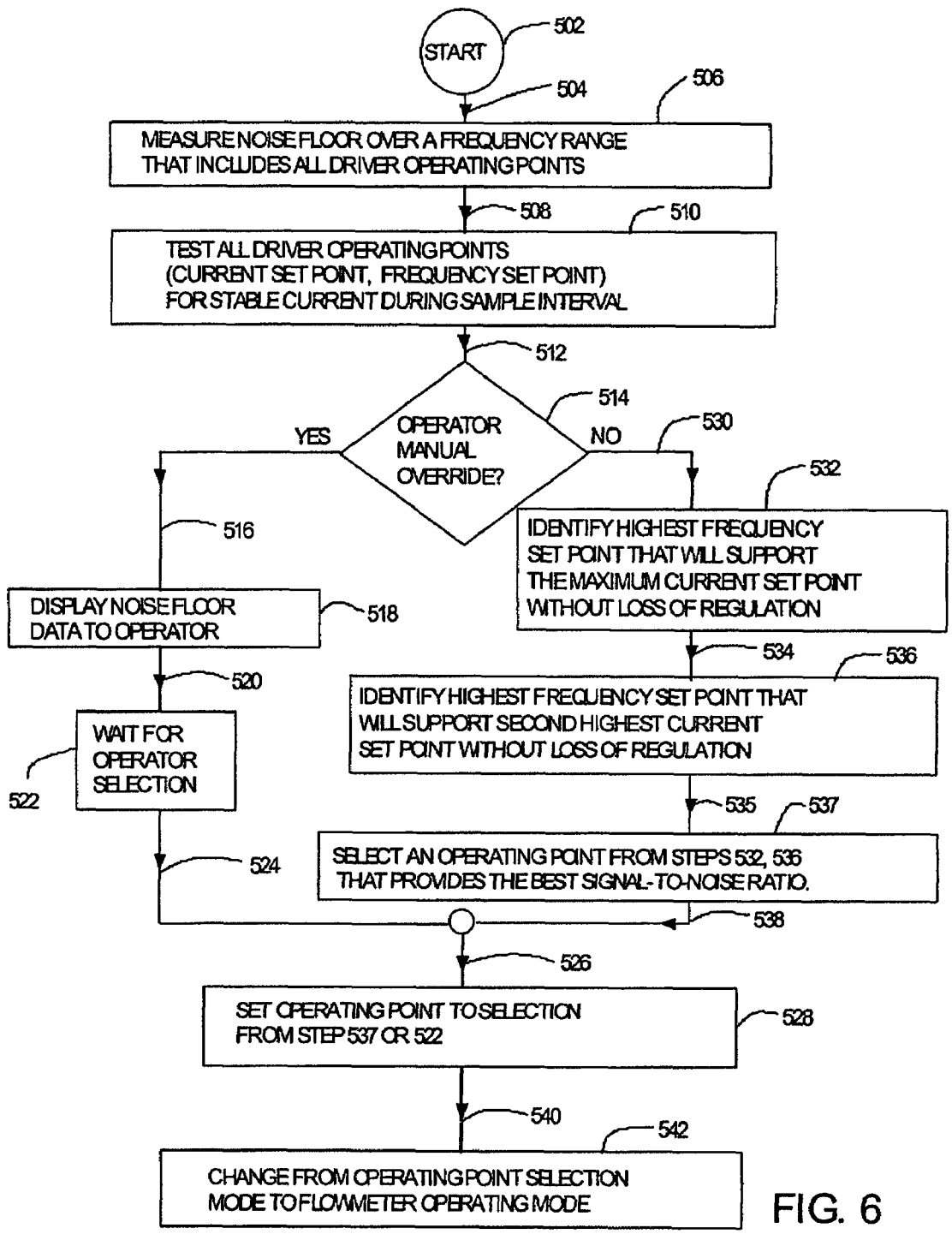
FIG. 6 illustrates a flow chart of operation of an electrode voltage analysis circuit.

FIG. 6 illustrates a flow chart of operation of the electrode voltage analysis circuit 254 in FIG. 2. Operation begins at start 502. Start 502 can comprise a start up at initial application of power to the flow transmitter 200. Start 502 can alternatively comprise an operator or software interrupt to redo the electrode voltage analysis during operation after initial power up. A software interrupt may be generated if the flowtube is producing an excessively noisy output. The frequency axis in FIG. 5 is a logarithmic axis.

Processing continues from start 502 along line 504 to action block 506. At action block 506, driver operating conditions are tested for stable coil current during the sample interval (FIG. 3). In one embodiment, all available driver operating conditions are tested. In another embodiment, driver operating conditions are tested along each amplitude axis at increasing frequencies only until a frequency is found at which the current is not stable. In yet another embodiment, driver operating conditions are tested along each frequency axis at increasing amplitudes only until a current amplitude is found where the current is not stable. Operating conditions above and to the right of a non-stable operating condition can be accepted as not stable without testing. Regardless of the testing method used, the testing identifies a group of operating conditions (group 440 in FIG. 4) for which the coil current is stable in the sample interval.

After completion of action block 506, processing continues along line 508 to action block 510. At action block 510, the noise floor is measured for each operating condition in the group of operating conditions identified (group 440). In one embodiment, each noise floor measurement and each operating condition in the identified group is entered into a table, and the table is sorted by noise floor measurement.

After completion of action block 506, processing continues along line 512 to decision block 514. At decision block 514, if the operator has entered a manual override, the processing continues along line 516 to action block 518. At action block 518, the operating conditions and their associated noise floors are displayed to the operator.

After completion of action block 518, processing continues along line 520 to action block 522. At action block 522, processing waits for the operator to enter a manual selection of an operating condition. After the operator enters a manual selection processing continues along lines 524, 526 to action block 528.

At decision block 514, if the operator has not entered a manual override, the processing continues along line 530 to action block 532. At action block 532, the higher frequency setpoint that will support the maximum current setpoint without loss of current regulation is identified.

After completion of action block 532, processing continues along line 534 to action block 536. At action block 536, the highest frequency setpoint that will support the second highest current setpoint without loss of current regulation is identified. After completion of action block 536, processing continues along line 535 to action block 537. At action block 537, an operating point is selected (from the two operating points identified in action blocks 532, 536) that has the best SNR. After completion of action block 537, processing continues along lines 538, 526 to action block 528.

At action block 528, the operational use operating condition is set to the selected operating condition. The selected operating condition can be provided either manually or automatically. After completion of action block 528, processing continues along line 540 to action block 542. At action block 542, the flow transmitter changes to the operating mode and the flow calculation circuit 266 calculates a flow output 268 (FIG. 2).

Figure 7:
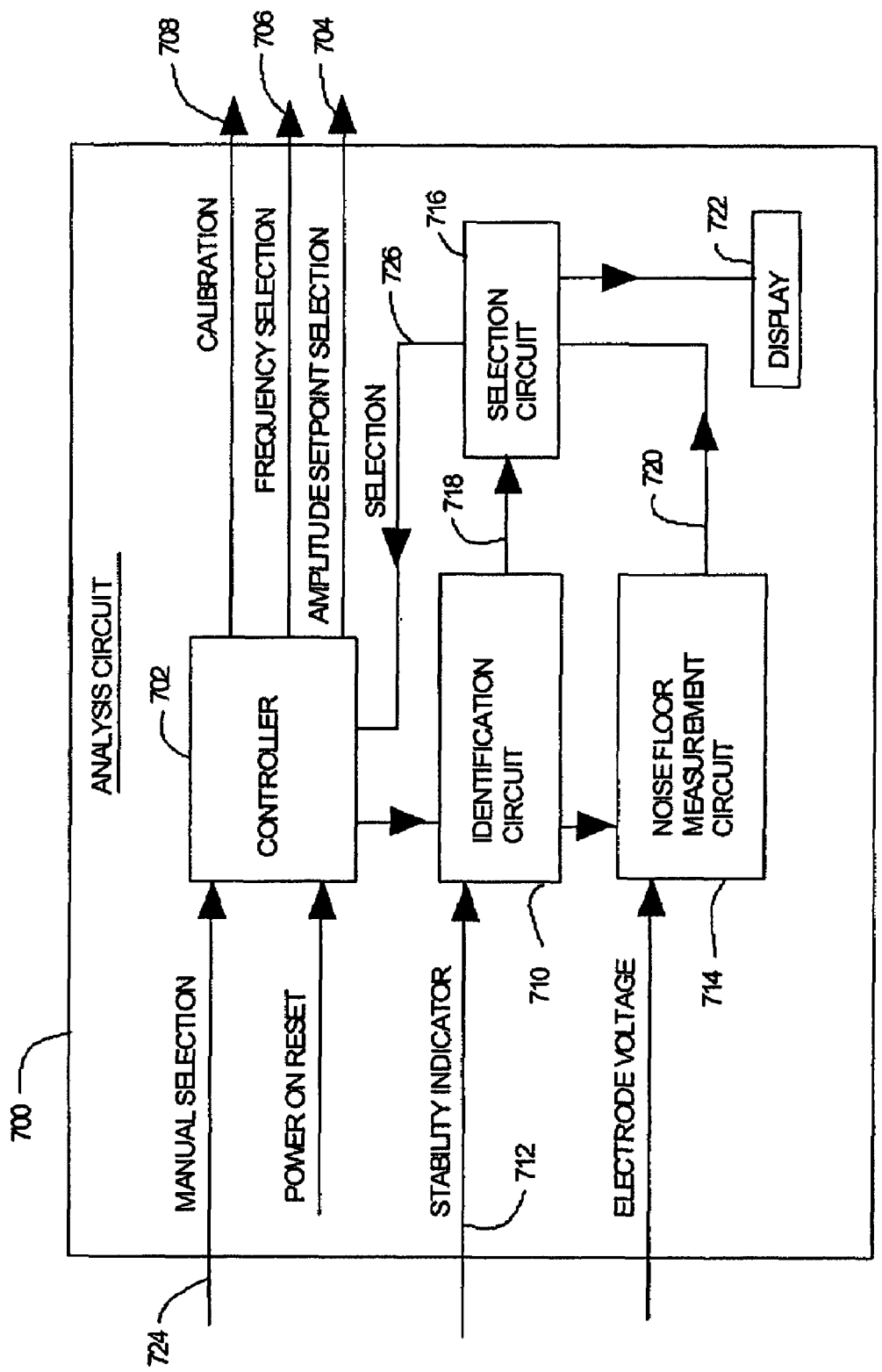
FIG. 7 illustrates an analysis circuit for an electromagnetic flow transmitter.

FIG. 7 illustrates an analysis circuit 700 for an electromagnetic flow tube and transmitter such as the flow tube and transmitter described above in connection with FIG. 2.

The analysis circuit 700 comprises a controller 702. The controller 702 provides a sequence of diagnostic operating conditions of coil current amplitude 704 and frequency 706 for a coil of the flow tube. In one embodiment, the controller 702 also provides a calibration output 708 which adjusts a calibration of a flow calculation circuit for a selected operating condition.

The analysis circuit 700 comprises an identification circuit 710. The identification circuit 710 identifies one or more of the diagnostic operating conditions for which the coil current is stable during a sample interval. The identification circuit 710 senses a stability indicator 712. In one embodiment, the stability indicator 712 comprises sensed coil current (as indicated at line 272 in FIG. 2). In another embodiment, the stability indicator 712 comprises a flow voltage component of the electrode voltage (as indicated at lines 256, 258 in FIG. 2).

The analysis circuit 700 further includes a noise floor measurement circuit 714. The noise floor measurement circuit 714 measures a noise floor of a flow tube electrode voltage (lines 256, 258 in FIG. 2) for the identified diagnostic operating conditions.

The analysis circuit 700 further comprises a selection circuit 716. The selection circuit 716 selects one of the diagnostic operating conditions as a measurement operating condition as a function of the noise floor measurements. The selection circuit 716 receives a list of the identified operating conditions on line 718. The selection circuit receives a list of noise floor measurements on line 720. In some particularly noisy applications with large flow tubes, the list may consist of a single operating condition and its noise floor. The selection of the measurement operating condition is a function of an amplitude of a flow voltage component of the electrode voltage. In one embodiment, a signal-to-noise ratio is calculated from the flow voltage component and noise floor for each identified operating condition. In one embodiment, the selection circuit 716 operates automatically to provide a selected operating condition 726 with optimal noise characteristics to the controller 702. In another embodiment, the analysis circuit 700 includes a display 722 which displays the currents and frequencies of identified operating conditions and also displays signal-to-noise ratios and noise floors for each operating condition. After observation of the display 722, a skilled operator can make a manual selection 724 of an optimal operating condition based on the operators knowledge and experience.

In one embodiment, the controller 702 provides a first diagnostic sequence of operating conditions with a fixed amplitude and starting at a lower frequency and increasing to a higher frequency until a diagnostic operating condition is found for which the coil current is not stable during the sample interval. In another embodiment, the controller 702 provides a second diagnostic sequence of operating conditions with a fixed frequency and starting at a lower amplitude and increasing to a higher amplitude until a diagnostic operating condition is found for which the coil current is not stable during the sample interval.

In one embodiment, the noise floor measurement circuit measures flow standard deviation at multiple coil currents and frequencies and the most stable measurement is chosen. In another embodiment, the selected operating condition adjusts automatically to changing flow rate.

In one embodiment, the analysis circuit comprises a microprocessor embedded in the electromagnetic flow transmitter. In another embodiment, the microprocessor functions as a controller that controls the sequence of operating points. The microprocessor is programmed with software.

Although the present invention has been described with reference to preferred embodiments, workers skilled in the art will recognize that changes may be made in form and detail without departing from the spirit and scope of the invention.

What is claimed is:

1. An analysis circuit for an electromagnetic flow tube and transmitter, comprising:
    a controller that provides diagnostic operating conditions of coil current amplitude and frequency for a coil of the flow tube;
    an identification circuit that identifies one or more of the diagnostic operating conditions for which the coil current is stable during a sample interval;
    a noise floor measurement circuit that measures a noise floor of a flow tube electrode voltage for the identified diagnostic operating conditions and provides a noise floor measurement output; and
    a selection circuit that selects at least one of the diagnostic operating conditions as a measurement operating condition as a function of the noise floor measurement output.

2. The analysis circuit of claim 1 wherein the selection of the measurement operating condition is a function of an amplitude of a flow voltage component of the electrode voltage.

3. The analysis circuit of claim 1 wherein the identification circuit receives a stability indicator.

4. The analysis circuit of claim 3 wherein the stability indicator comprises sensed coil current.

5. The analysis circuit of claim 3 wherein the stability indicator comprises a flow voltage component of the electrode voltage.

6. The analysis circuit of claim 1 wherein the controller provides a first diagnostic sequence of operating conditions with a fixed amplitude and starting at a lower frequency and increasing to a higher frequency until a diagnostic operating condition is found for which the coil current is not stable during the sample interval.

7. The analysis circuit of claim 1 wherein the controller provides a second diagnostic sequence of operating conditions with a fixed frequency and starting at a lower amplitude and increasing to a higher amplitude until a diagnostic operating condition is found for which the coil current is not stable during the sample interval.

8. The analysis circuit of claim 1 and further comprising a display of amplitudes and frequencies of identified operating conditions and noise floor measurements for the identified operating conditions.

9. The analysis circuit of claim 1 and further comprising a display configured to amplitudes and frequencies of identified operating conditions and signal-to-noise measurements for the identified operating conditions.

10. The analysis circuit of claim 1 wherein the selection circuit is further configured to select one of the diagnostic operating points to provide a highest measurement of signal to noise ratio.

11. A method of analysis of operating conditions for an electromagnetic flowmeter, comprising:
    providing diagnostic operating conditions of coil current amplitude and frequency for a coil of the flow tube;
    identifying one or more of the diagnostic operating conditions for which the coil current is stable during a sample interval;
    measuring a noise floor of a flow tube electrode voltage for the identified diagnostic operating conditions and providing a noise floor measurement output; and
    selecting at least one of the diagnostic operating conditions as a measurement operating condition as a function of the noise floor measurement output.

12. The method of claim 11 and selecting the measurement operating condition as a function of an amplitude of a flow voltage component of the electrode voltage.

13. The method of claim 11 and receiving a stability indicator.

14. The method of claim 13 and sensing coil current as the stability indicator.

15. The method of claim 13 and sensing a flow voltage component of the electrode voltage as a stability indicator.

16. The method of claim 11 and providing a first diagnostic sequence of operating conditions with a fixed amplitude and starting at a lower frequency and increasing to a higher frequency until a diagnostic operating condition is found for which the coil current is not stable during the sample interval.

17. The method of claim 11 and providing a second diagnostic sequence of operating conditions with a fixed frequency and starting at a lower amplitude and increasing to a higher amplitude until a diagnostic operating condition is found for which the coil current is not stable during the sample interval.

18. The method of claim 11 and displaying amplitudes and frequencies of identified operating conditions and noise floor measurements for the identified operating conditions.

19. The method of claim 11 and displaying amplitudes and frequencies of identified operating conditions and signal-to-noise measurements for the identified operating conditions.

20. A magnetic flowmeter, comprising:
    an electromagnetic flow transmitter providing a coil current and measuring an electrode voltage;
    an electromagnetic flow tube have a coil receiving the coil current and having electrodes providing an electrode voltage; and
    an analysis circuit providing diagnostic operating conditions, identifying one or more of the diagnostic operating conditions for which the coil current is stable during a sample interval, and selecting at least one of the diagnostic operating conditions as a measurement operating condition as a function of a measured noise floor of the electrode voltage.

21. The magnetic flowmeter of claim 20 and comprising a boost circuit.

22. The magnetic flowmeter of claim 21 wherein flow standard deviation is measured at multiple coil currents and frequencies and the most stable measurement is chosen.

23. The magnetic flowmeter of claim 20 wherein the analysis circuit comprises a microprocessor embedded in the electromagnetic flow transmitter.

24. The magnetic flowmeter of claim 23 wherein the microprocessor functions as a controller that controls the sequence of operating points.

25. The magnetic flowmeter of claim 20 wherein the selection circuit is further configured to select one of the diagnostic operating points to provide a highest measurement of signal to noise ratio.

* * * * *